(No Model.)
H. TUDOR.
ELECTRODE FOR SECONDARY BATTERIES.
No. 413,112. Patented Oct. 15, 1889.
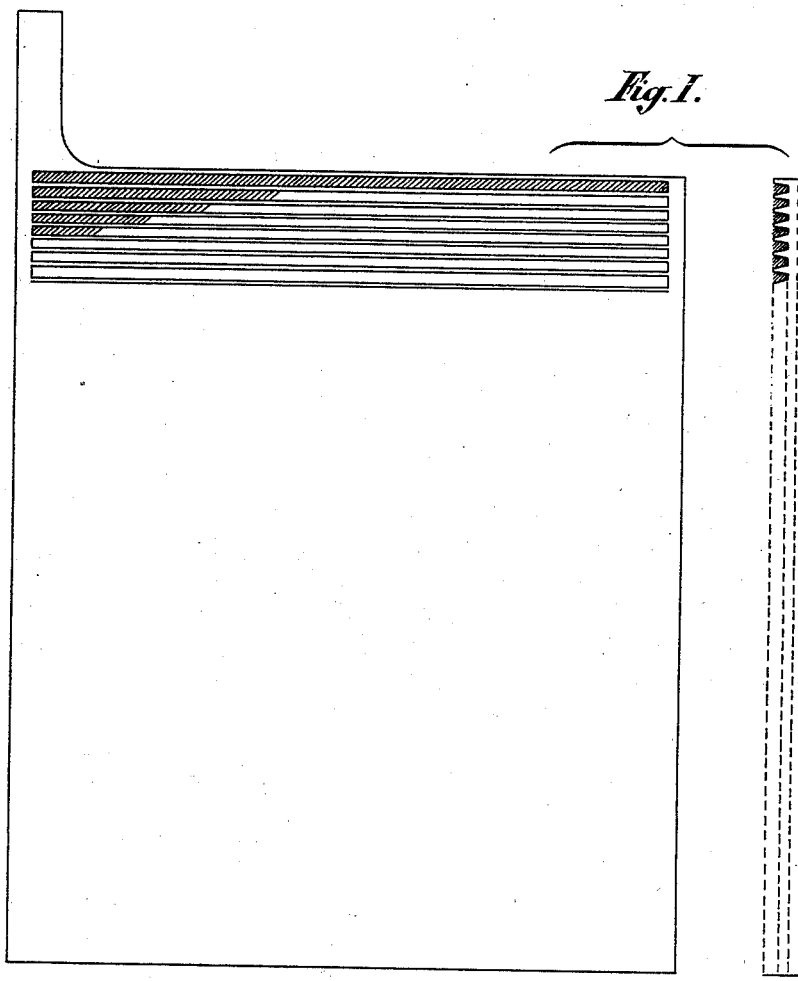
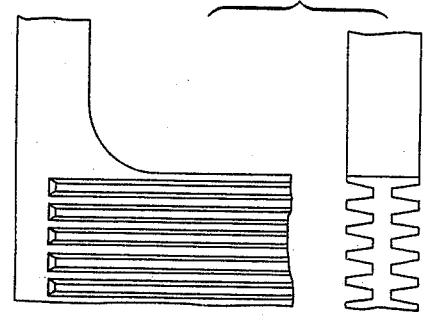
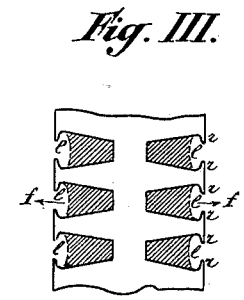

United States Patent Office.

HENRY TUDOR, OF ROSPORT, LUXEMBURG, GERMANY.

ELECTRODE FOR SECONDARY BATTERIES.

SPECIFICATION forming part of Letters Patent No. 413,112, dated October 15, 1889.

Application filed May 21, 1889. Serial No. 311,554. (No model.) Patented in Belgium October 30, 1886, No. 75,066; in France November 2, 1886, No. 179,393, and in England August 24, 1887, No. 11,543.

*To all whom it may concern:*

Be it known that I, HENRY TUDOR, electrician, a citizen of the Grand Duchy of Luxemburg, and a resident of Rosport, in the Grand Duchy of Luxemburg, Germany, have invented new and useful Improvements in Electrodes for Electric Accumulators or Secondary Batteries, (for which I have obtained patents in Belgium on the 30th of October, 1886, No. 75,066; in France the 2d of November, 1886, No. 179,393, and in England the 24th of August, 1887, No. 11,543,) of which the following is a specification.

The improvements consist in a particular construction and in a new kind of formation of plates constituting the electrodes of the secondary elements or electric accumulators in order to give to these electrodes a large active surface and at the same time a great rigidity and a high electric conductibility while fixing perfectly the oxides of lead and preventing these from detaching themselves, and, in fine, preventing the plates from losing their formation caused by the alternative increase and diminution of the masses of oxides of lead during the charge and discharge of the elements.

In the drawings annexed to this specification, Figure 1 represents a side elevation and section of a plate with straight grooves. Fig. 2 is a partial view of the same on a larger scale. Fig. 3 is a transverse section showing the grooves with the ribs folded or bent and covered with salts of lead to the required quantity.

The electrodes are formed of a body of cast-lead, and they carry upon their two surfaces symmetric parallel ridges with sloping sides, which can be made nearer together or wider apart and more or less deep. The formation of these ridges naturally entails the making of grooves equally symmetric, parallel, and with sloping sides. These ridges are strengthened in each of their extremities by buttresses, by means of which the plates repose upon the slips at the bottom of the vessels in which they are contained. The grooves can be arranged either horizontally or vertically, and are formed either straight, round, or in any other geometric arrangement.

Fig. 1 is an example of a plate with straight and horizontal grooves.

The plates thus obtained are treated first, according to the method of Mr. Gaston Planté, in such manner that upon the surface of the positive electrodes there is formed a crystalline and adherent bed of peroxide of lead. The grooves of the positive plates are next filled with a paste of peroxide of lead, of such fashion that these grooves are only partially filled, in such manner as to leave an empty space. Then the edges of the grooves are flared, enlarged, or spread out at right angles or folded by friction, by pressure, or by any other mechanical method in such manner that only a little space is left free for the access of acidulated water, and permits this to come in contact with the oxides which are found in the hollow of the groove. In consequence of the taper of the grooves the reaction of the pressures exerted in the mass of the peroxide, which expands and contracts during the charge and the discharge on the symmetrical surfaces of the ridges, takes place in the direction of the arrow, Fig. 3. The mass of peroxide can then dilate in the direction of the arrow $f$, since a free space has been arranged, and by reason of the projection $r$, obtained in the manner described above, these oxides of lead cannot detach themselves from the plate nor fall to the bottom of the vessels. Finally, by means of the application of the peroxide of lead upon the covered or peroxidized surfaces themselves, even of crystalline and adherent peroxide, there is an intimate union of the salts of lead with the conducting material of the plate, forming the body of the plate, this giving rise to a great electric conductibility and preventing the formation of a layer of sulphate—a bad conductor—between the paste that has been applied and the metal—that is to say, the lead and the supporting-plate.

Having now particularly described and ascertained the nature of my said invention and in what manner the same is to be performed, I declare that what I claim is—

1. A plate or element for secondary batteries having projections or ribs with sloping sides and enlarged or spread edges, substantially as set forth.

2. In a secondary battery, the combination of a support-plate having an oxidized surface and an additional coating or filling of an active material, as set forth.

3. In a secondary battery, an element consisting of a lead base or support-plate converted wholly or partially into a crystalline adherent bed of peroxide of lead and an additional coating or filling of peroxide of lead, substantially as and for the purpose set forth.

HENRY TUDOR.

Witnesses:
A. VANDENKER KHOVER,
ADOLF STEIN.